United States Patent [19]
Sperberg

[11] 3,894,421
[45] July 15, 1975

[54] METHOD OF MEASURING TIRE DYNAMIC STRENGTH

[76] Inventor: Lawrence R. Sperberg, 6740 Fiesta Dr., El Paso, Tex. 79912

[22] Filed: Aug. 17, 1973

[21] Appl. No.: 389,434

[52] U.S. Cl. ............... 73/146; 141/4; 141/83
[51] Int. Cl. ............................. G01m 17/02
[58] Field of Search...... 73/146, 8, 432 SM; 141/83, 141/38, 4, 1

[56] References Cited
UNITED STATES PATENTS

| | | | |
|---|---|---|---|
| 3,316,758 | 5/1967 | Wild | 73/146 |
| 3,455,156 | 7/1969 | Kelly | 73/146 |
| 3,599,486 | 8/1971 | Pernau | 73/146 |

*Primary Examiner*—Donald O. Woodiel
*Attorney, Agent, or Firm*—Marcus L. Bates

[57] ABSTRACT

Method of determining the weakest point in pneumatic tires comprising simultaneously subjecting each individual cord of the plies of the tire to a force of a duration and magnitude equivalent to the force to which the individual cords of the plies of the tire undergoes as it rolls through its footprint while performing at some specified vehicle weight load, inflation pressure, vehicle velocity, and acceleration.

The present method is carried out by causing a sudden increased pressure, such as a pneumatic pressure, to be exerted within the pneumatic cushioning chamber of the tire at a rate of change in pressure equal to the rate of change in the force imposed upon the individual cords of the plies of the tire during one revolution of rotation.

More specifically, a selected one of various combustible gases is admixed with a reactant in a concentration to provide for the above mentioned force. The combustion reaction may be monitored to determine the characteristics thereof. The reaction provides for a predetermined force to be effected at a predetermined rate within the tire chamber. The failure of a tire indicates the weakest point of the tire structure which may be a hidden defect of a gross or a minor nature.

56 Claims, 18 Drawing Figures

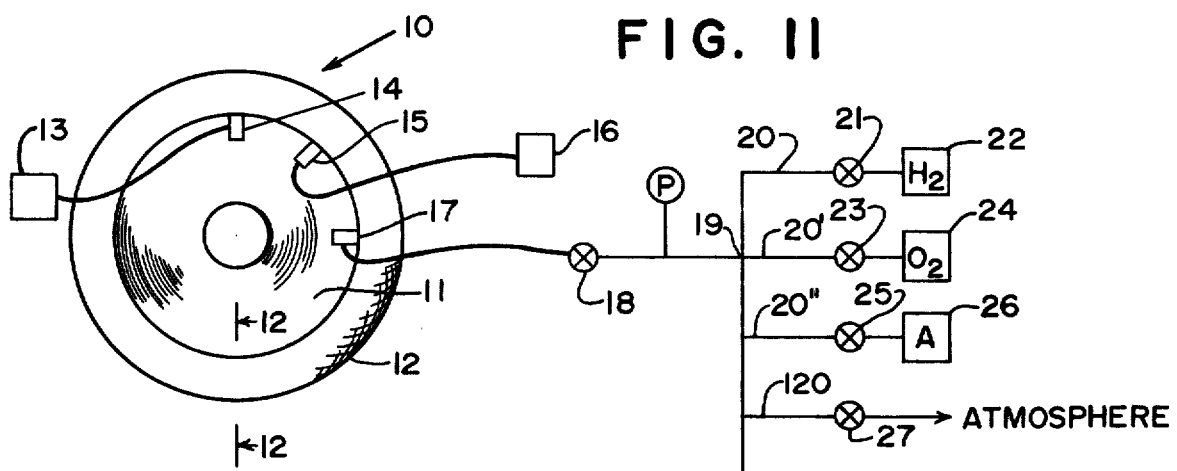
FIG. 11
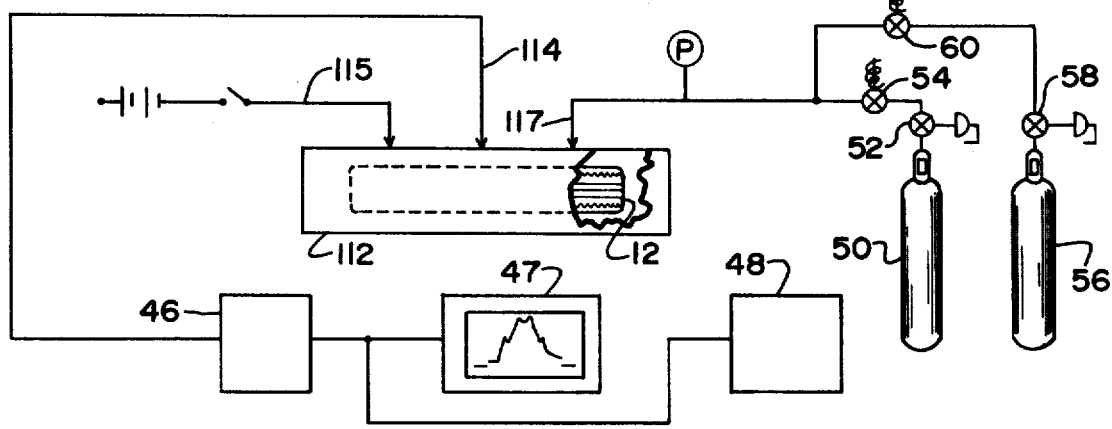
FIG. 12
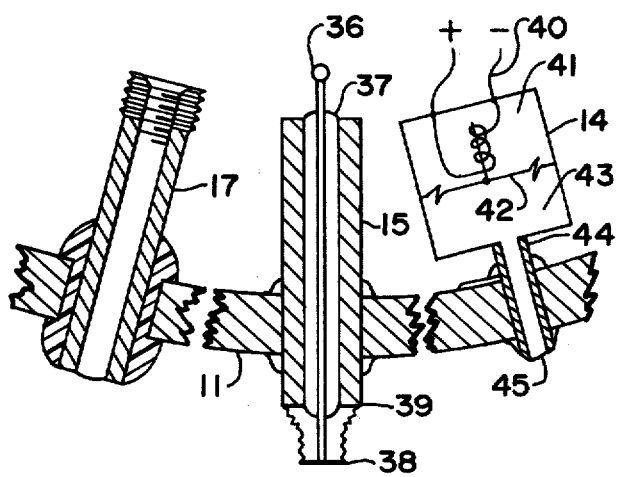
FIG. 13
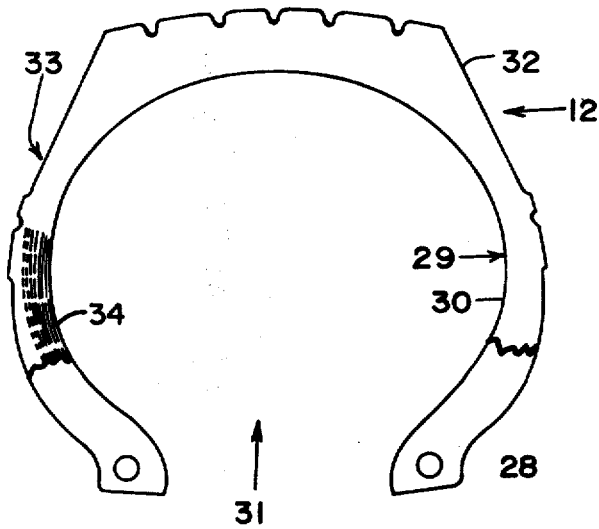
FIG. 14
FIG. 15

METHOD OF MEASURING TIRE DYNAMIC STRENGTH

BACKGROUND OF THE INVENTION

A tire must transmit power from a vehicle and its power plant to a ground supporting surface. Some important functions that a tire must perform are load carrying capacity, enveloping, cushioning, skid resistance, durability, transmission of braking forces, transmission of torque, torsional stability, flotation, mobility, cornering, abrasion resistance, and low rolling resistance, all of which involve power transmission except for load carrying capacity and the tires flotation property.

Power transmission through the tire commences with fuel being combusted in the firing chamber to provide heat energy. The heat energy is converted to mechanical energy through the reciprocating pistons attached to the rotating crankshaft. The crankshaft is connected to the transmission through a clutch arrangement. The transmission is connected to the differential through a propeller shaft. In the differential the power is divided and sent down each of the drive axles to the wheels and thence into the cord structure of the tire. All of the cord structure is not used simultaneously to transmit power; at any instant in time only the cords fastened to the ground supporting surface on one end and to the bead wire on the other end is used for transmitting power. As the tire moves through different footprints, different cords are used to transmit the power. The power flows from one layer of cords through the insulating rubber compound, and finally through the tire tread to the ground supporting surface.

When the tire is inflated the cord structure is placed under tension. The magnitude of the tension is proportional to the inflation pressure, and in an ideally perfect tire the cord tension for any inflation pressure is equal along the entire core path which extends from bead to bead, or from end to end, and in addition the tensions measured in the individual cords should be equal in each cord of the perfect tire body. Cord tension in the crown of a bias constructed tire can be calculated from the following equation:

$$t = \frac{p\,r}{n},$$

where $t$ is cord tension, $p$ the tire inflation pressure, $r$ the radius of the cord arc, and $n$ the number of cords per inch multiplied by the number of plies. The radius $r$ of the cord arc can be calculated from the following equation:

$$\frac{1}{r} = \frac{\sin d^2}{R_B} + \frac{\cos d^2}{R_A}$$

wherein $R_A$ is the radius along the equatorial axis, $R_B$ the radius along the radial axis, and $d$ the angle made by the cord with an imaginary great circle line at the point where the tension is being determined.

In a radial tire, angle $d$ becomes 90°. Since sin 90° is 1.000 and cosine 90° is zero, $r$ becomes $R_B$, the radius along the radial axis of the cord body in this limiting case.

It is therefore seen that for any tire having a fixed inflation pressure $p$ and a constant $n$ (number of cords per inch times the number of plies) the tension in the cord $t$ varies directly with cord path arc radius $r$.

The angle at which a pluse force is applied to a cord in tension has a great bearing upon the resulting cord tension. When the pulse force is applied in the same direction as the cord orientation the force is additive to the tension attributable to inflation. When the pulse force is applied perpendicular to the axis of the cord the pulse is magnified by a leverage effect whose magnitude is dependent upon the angle bend effected for the cord. A simple equation to express the leverage concept for the deformation of an inextensible cord is:

$$r = \frac{\sin \theta}{1 - \cos \theta} \times f$$

where F is the tension along the axis of the cord at the anchor points and "$\theta$" the angular deformation brought about by application of pulse force $f$. At extremely small angles the value of F goes up astronomically for any increase in pulse force $f$.

As the power cyclically flows through an individual cord of the cord structure it flows as discreet pulses as shown in the sinusoidal curve of FIG. 2 for a point in the cord located in the tire crown. To the basic tension of the cord imparted by the inflation pressure of FIG. 1 there is added the pulse force occurring when the cord transmits power from where it is fastened to the bead wire on one end and fastened to the ground on the remaining end located in the tire footprint. This results in the tension in the cord increasing to a maximum, but as the cord moves into the footprint the tension in the cord decreases. This decrease of cord tension is partially due to the cord length being effectively shortened, since in the footprint, the cord is laying along a level plane while out of the footprint the cord lays in an arc. As the cord moves from an arc to a level plane configuration the tension in the cord decreases to a minimum value and then rises to its original value as the configuration returns to an arc. A further contributing factor causing the reduction in tension to assume a value below that imparted by the inflation pressure is attributable to the action of one bias ply working against the oppositely biased ply. Tension, when placed on the cords of one ply, works to compress the adjacent oppositely biased ply at certain positions in the tire's rotation thereby contributing to a reduction in the cord tension in this oppositely biased ply below the tension imparted by the inflation pressure as well as sometimes causing these oppositely biased cords to be changed from a state of tension to a state of compression. The presence of an essential mirror image to FIG. 2 for a point in a cord adjacent to and oppositely biased from that shown has also been observed.

Each cord in a tire supporting a weight goes through this basic pulse each time the tire rotates through its footprint in covering one revolution of rotation although the actual pulse can and does vary within a cord dependent upon where the change in tension is measured. The sidewall of a tire does not go through a footprint; therefore, as seen in FIG. 3, the cord transmits the pulse force associated with the transmittal of power but does not undergo the abrupt drop in tension below the inflation tension undergone in the footprint when the arc contour is changed to a flat plane. The cord arc becomes more pronounced in the sidewall as the tire moves through the footprint causing the pulse force to be accentuated. The curve depicted in FIG. 3 has been arrived at through logic because its essential shape must be similar to a square wave rather than a spiked, sine shaped one. It is possible, however, that the tail end of the curve goes through a tension loss below the tension attributable to inflation.

As the inflation pressure is varied, the pulse forces shown in FIGS. 2 and 3 may be altered upward or downward, dependent upon the inflation pressure, as pointed out in conjunction with FIG. 1. Additionally, the dip in the curve of FIG. 2 caused by the cord tension decreasing below the value imparted by inflation is altered as the footprint configuration changes as function of inflation pressure.

As the vehicle load is increased with a resultant increased deflection of the tire, the bottom portion of the pulse of FIG. 2 is altered. As vehicle speed increases with a resultant increases in the power flow, the pulse force becomes greater in magnitude and goes to higher tension values in the upper portion of the pulse curves of FIGS. 2 and 3.

The cord tension on the pulling end of a cord located on the inside edge of the footprint has a pulse force curve such as seen illustrated in FIG. 4. The pulse force increase above the inflation pressure tension is of the same magnitude as the increases of FIGS. 2 and 3, but the decrease in tension below the inflation tension is much shallower because the designated point is much nearer to the end of the cord arc rather than being in the middle of the arc in the manner depicted in FIG. 2.

Examination of the cord tension at an equal distance from the edge of the footprint along the trailing end of the cord is postulated to provide a tension curve similar to the one shown in FIG. 5. The tension of the cord on the trailing end between the footprint and the steel bead remains essentially at a value effected by the inflation pressure together with the tension which results from centrifugal force. As the individual cords transmit power, the pulse force attempts to pull the cord from the adhering rubber which insulates each cord from every other cord.

A high percentage of tire failures is attributed to a loss in the bonding strength of the cord to the insulation rubber. Some tires fail due to deterioration of the rubber insulation compound while still others fail due to the strength of the cords finally being exceeded. A few tires fail because the strength of the bead wires is exceeded, or because the strength of the bond between the wire and the rubber insulating the wires from each other drops to a low value.

A number of separation type tire failures are caused by cord tension changes such as depicted in FIG. 2 and more specifically by that portion of the curve falling below the tension attributable to the inflation pressure, while the X and Y shaped ruptures are most probably associated with the overall cord tension changes of FIG. 3.

The typical passenger tire footprint inflated to varying levels and subject to different weight loads comprises from 6 to 11 percent of the true rolling circumference as determined from the measured rolling radii, as more specifically set forth in Table I.

These data indicate that at the normal inflation pressure used by the average motorist the tire footprint comprises 7.5 percent of the tire rolling circumference. The ordinary G78–15 size tire rotates approximately 750 revolutions in negotiating 1 mile. Thus, at a speed of 70 mph, the tire rotates 14.58 revolutions per second. The duration of each rotation is accordingly 0.06858 seconds. Since the footprint comprises 7.5 percent of the rolling circumference, the time required to traverse the footprint at the tire midcrown is 5.14 milliseconds. At the tire shoulder the time in only 4.1 milliseconds since a shorter length is traversed in the footprint. These values represent the times required for the total pulse force transmittals of FIGS. 2 and 3 for the identified conditions of vehicle speed and tire size. But the time of 5.14 milliseconds required to traverse a footprint covers the entire time for the pulse curve of FIG. 2. Therefore the time required to go from C to D is only 2.57 milliseconds, while the time required to go from A to B is estimated 0.5 to 1 millisecond, as set forth in Table II.

The total force which a vehicle must overcome when accelerating may be calculated from the equation F × m a. For a vehicle weighing 3,150 pounds and accelerating from 0 to 40 mph from a standing stop, the acceleration may reach 10 ft/sec² particularly in those vehicles where the power plant is of moderate to large size. Hence, $$\text{Force} = \frac{3150 \times 10}{32.2} = 978 \text{ pounds,}$$

which represents the total force being overcome as the vehicle accelerates from a standing stop to the designated velocity. The entire force is provided by the two drive axle tires. Each drive tire is being resisted by 489 pounds of force. In tires having two body plies, the cord end count per ply is usually 11 cords per inch. From the footprint length it is determined that at 28 psi inflation there are a total of 143 cords effectively tied to the ground at any one time and the pulse force carried by each cord is 3.42 pounds. For a vehicle gross weight of 4,150 pounds, the total force becomes 644 pounds per tire. At the heavier weight the tire footprint is a little longer so that there are a determined 160 cords tied to the ground through the footprint making the pulse force 4.03 pounds per cord. At the velocity of 40 mph, the time required to traverse the distance from point C to D in FIG. 2 is 4.5 milliseconds and the time to go from A to B of FIG. 2 is probably 1 millisecond or longer.

In cars having large power plants the pulse forces of 2.82 pounds per cord may be rached in accelerating at 7 ft/sec², but the times are considerably shorter, being 3 milliseconds to go from C to D and probably less than 1 millisecond to go from A to B of FIG. 2.

Where a vehicle is not accelerating and instead is traveling at a constant speed, the power plant must deliver sufficient mechanical energy to the drive axle to equal the forces resisting the movement of the vehicle. The overcoming of these resisting forces result in a pulse force of a lesser magnitude than encountered in rapid acceleration from a standing stop, as exemplified by the data of Table III.

As power flows through the cord and rubber structure of a tire it is evident from FIGS. 2, 3, 4, and 5 that if one were to determine the change in cord tension at various points along the cord path as the tire moves through its footprint, the curves would all range from the extremes of FIGS. 2 and 3 to the minimum of FIG.

5 for the leading or pulling edge of cord. As the point being examined moves from the crown of the tire to the edge of the footprint in the trailing half of the cord, the curve configuration would move back from that of FIG. 2 to that of FIG. 5. As the point being examined moves away from the footprint into the sidewall, the tension in the trailing end of the cord remains relatively unchanged at the level imparted by the inflation pressure.

It is therefore evident that the forces imposed upon the individual cords contained within a ply of a pneumatic tire can be ascertained with exactness. Accordingly, the maximum anticipated forces with their rate application to be endured by the cord structure of a tire can also be determined. It would therefore be desirable to dynamically test a tire by duplicating the actual anticipated forces to be encountered when the tire reaches the ultimate purchaser and is placed in service upon a vehicle. This expedient enable tires having hidden defects contained therein to be discovered while the tire is within the control of the manufacturer. It also enables any predetermined force of any rate of application to be determined for a maximum service application.

SUMMARY OF THE INVENTION

Method of determining the weakest point which may be a hidden defect in pneumatic tires comprising simultaneously subjecting each individual cord of the plies of the tire to a force of a duration and magnitude equivalent to the force to which the individual cords of the tire undergoes as it rolls through its footprint while being subjected to performing at some selected maximum vehicle weight load, inflation pressure, vehicle velocity, and acceleration.

The present method is carried out by causing a sudden increased pressure, such as a pneumetic pressure, to be exerted within the pneumatic cushioning chamber of the tire at a rate of change in pressure equal to the rate of change in the force imposed upon the individual cords of the plies of the tire during one revolution of rotation.

More specifically, a selected one of various combustible gases is admixed with a reactant in a concentration to provide for the above mentioned force, and the reaction is monitored to determine the characteristics thereof, and to enable a predetermined force to be effected within the tire chamber. The failure of a tire indicates a hidden defect.

Accordingly, a primary object of the invention is the provision of a method of determining hidden defects in a pneumatic tire.

Another object of the invention is to simultaneously subject the cords of a tire to a pulse force equal to the pulse force experienced by a tire cord under severe conditions of anticipated usage of the tire.

A further object of this invention is to provide a method by which a defective tire is destructively tested while at the same time structurally sound tires are uninjured by the test.

A still further object of the invention is to provide a method for destroying defective new tires.

Another and still further object is to provide a method for eliminating structurally defective tires from a tire manufacturing process.

An additional object of this invention is to provide method and apparatus for studying pulse forces generated in a rolling pneumatic tire.

Another object of the present invention is to provide a method of duplicating ply cord tension forces effected in a rolling loaded tire.

A further object of this invention is to provide method and apparatus for discovering hidden defects in new and used tires.

A still further object of this invention is to provide a pulse force of a mass and acceleration for duplicating portions of the pulse forces generated in a rotating pneumatic in contact with a relative moving surface.

Another and still further object is to provide a rapid and simple method and apparatus for studying changes in the dynamic strength of new and different structural modifications effected in pneumatic tires.

An additional object of this invention is to provide a rapid method of comparing the effect of structural change made in a tire design.

Another object of the invention is to provide a means for screening tires for their potential retreadability.

A further object of this invention is a method of determining the weakest point in a tire by destructively testing the tire with an explosive force.

A still further object of this invention is to provide a test for newly manufactured tires on a production line to assure that the tires have a minimum dynamic threshold strength.

Another and still further object is to provide a test technique for used and new tires in order to ascertain that their strength is in excess of a minimum safe strength value.

These and various other objects and advantages of the invention will become readily apparent to those skilled in the art upon reading the following detailed description and claims and by referring to the accompanying drawings.

The above method is attained by the provision of a combination of elements which are fabricated in a manner substantially as described in the above abstract and summary.

BRIEF DESCRIPTION OF THE DRAWINGS

FIGS. 11 and 12 are a part diagrammatical, part schematical representation of apparatus which can be used in carrying out the method of the present invention;

FIG. 13 is an enlarged, fragmentary, part cross-sectional, part diagrammatical view of part of the apparatus disclosed in FIGS. 11 and 12;

FIG. 14 is a cross-sectional view of an ordinary tire;

FIG. 15 is an enlarged detail of part of the tire disclosed in FIG. 14;

DETAILED DESCRIPTION OF THE PREFERRED EMBODIMENTS

Figure 1:
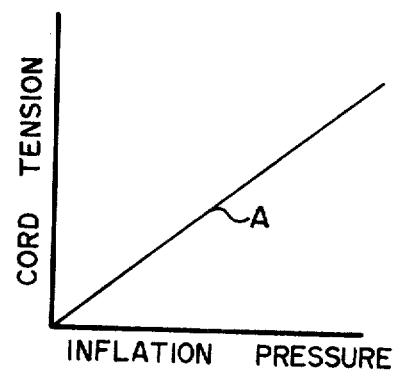
FIG. 1 is a plot of inflation pressure versus cord tension in a pneumatic tire.

In FIG. 1 there is disclosed a curve showing the effect of inflation pressure upon the tension of a tire cord of a ply which forms part of the tire body, with the tire being in a static condition. It will be noted that the tension increases linearly as the inflation pressure is increased.

Figure 2:
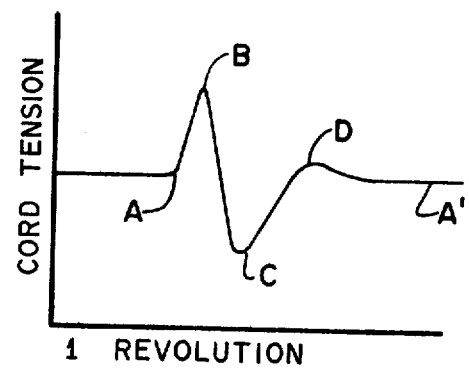
FIG. 2 is a plot of cord tension measured in a single cord of a tire ply structure as the tire is rotated through one revolution of rotation.

In FIG. 2, a weight and power load has been imposed upon the tire and the tire rotated through one revolution of rotation while supporting the load, thereby causing the basic tension of the cord A imparted by the inflation pressure to be changed into the illustrated sinusotial curve A, B, C, D. As any one of the tire cords pass through the tire footprint, the tension increases from A to B, then decreases from B to C, again increases to D, before returning to its inflation tension A'. The magnitude of point A is dependent upon the inflation pressure while the magnitude of points B and C, respectively, are dependent upon power and weight load, respectively.

Figure 3:
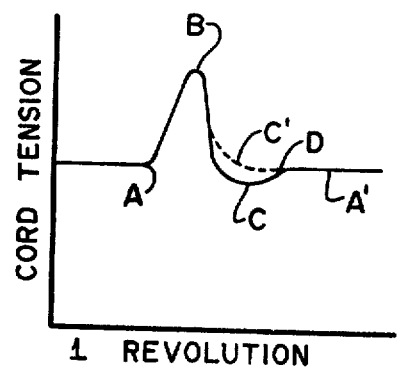
FIG. 3 is a plot similar to FIG. 2, but measured in a different location.

FIG. 3 is a hypothetical consideration of the cord tension present in a marginal length of a side wall cord of a pneumatic tire and measured during one revolution of rotation of the tire. As a marginal length of tire cord located in the side wall of the tire rotates, the tension thereof increases from the inflation tension or force A to a maximum force B, and then decreases to a minimum value C or C' before returning to its original tension at A'.

Figure 4:
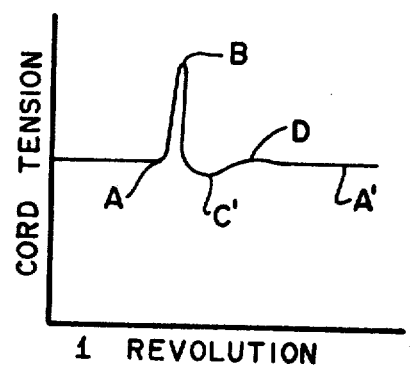
FIG. 4 is a plot, similar to FIGS. 2 and 3, measured in still another location.

In FIG. 4 there is seen a plot of the cord tension variation measured inside the edge of the footprint as the tire within which the cord is located is rotated through one revolution of rotation. As seen in FIG. 4, the cord tension A brought about the inflation pressure changes to a maximum at B and then goes through a minimum C' before returning to the tension A' provided by the inflation pressure.

Figure 5:
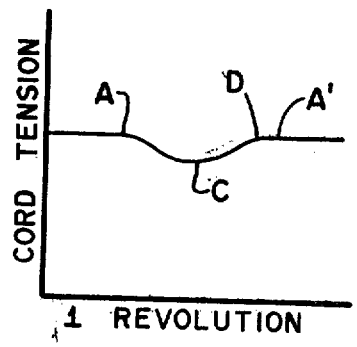
FIG. 5 is a plot similar to FIGS. 2-4, but measured in still another location.

In FIG. 5 there is seen a plot of the cord tension which was measured at the trailing end of a cord located in the edge of the footprint of the tire with the curve indicating that a marginal length of the cord at this particular location is reduced in tension to a value less than the tension brought about by the inflation pressure as it passes through the footprint of the tire.

Figure 6:
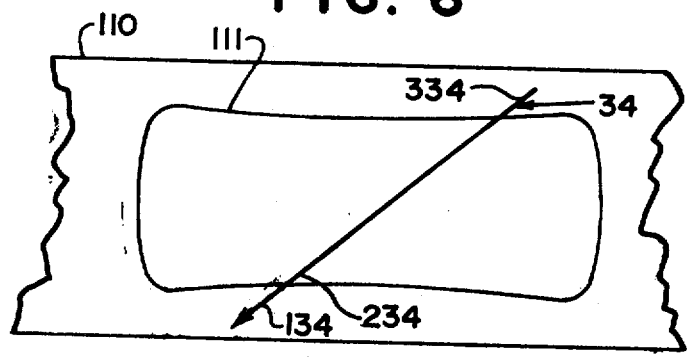
FIG. 6 is a diagrammatical representation of a footprint of a tire.

FIG. 6 is a diagrammatical representation of a tire footprint, wherein a tire supporting surface 110 is impressed with a bearing pressure indicated by the outline 111. A biased tire cord 34 has a leading edge portion 134 located without the footprint, a marginal length 234 located within the edge of the footprint, and a trailing marginal length 334 thereof located outside of the tire footprint.

Figure 7:
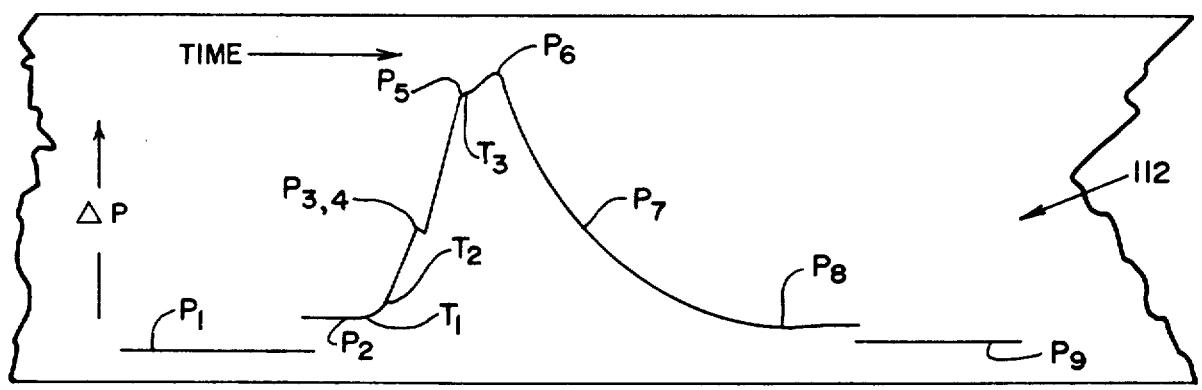
FIG. 7 is a time versus pressure plot of a typical combustion reaction pressure time chart carried out in accordance with the present invention.

FIG. 7 is illustrative of a plot of pressure versus time resulting from a typical combustion reaction pressure time chart having a characteristic such as may be expected when carrying out the invention in accordance with the teachings set forth herein. In FIG. 7, P1 represents the ambient pressure, or the pressure contained within the tire prior to placing the reactants or charge P2 therein. P3 represents the pressure when the spike of FIG. 8 first appears, while P4 represents the maximum spike pressure which occurs in this marginal portion of the curve. P5 represents an inflection point in the pressure rise curve that probably corresponds to growth of the tire in responding to the pressure being generated, while P6 represents the true pressure increase. P7 represents the decay pressure while P8 of the curve indicates the pressure evidenced within the inflation chamber after a short cool-down period. P9 is the ambient pressure measured after a short cool-down.

T1 portion of the curve is the ignition point while T2 represents the time at which the reaction pressure begins to increase at a rapid rate. T3 is the time at which the pressure increase commences to decrease sharply. As best appreciated from comparing FIGS. 7 and 8, the spike pressure P3, P4 cannot be analyzed without further magnification or enlargement of the curve, and accordingly, this portion of the curve is seen in greater detail in FIG. 8, wherein the values P2, P3, P4 referred to above are more clearly presented therein.

Figure 9:
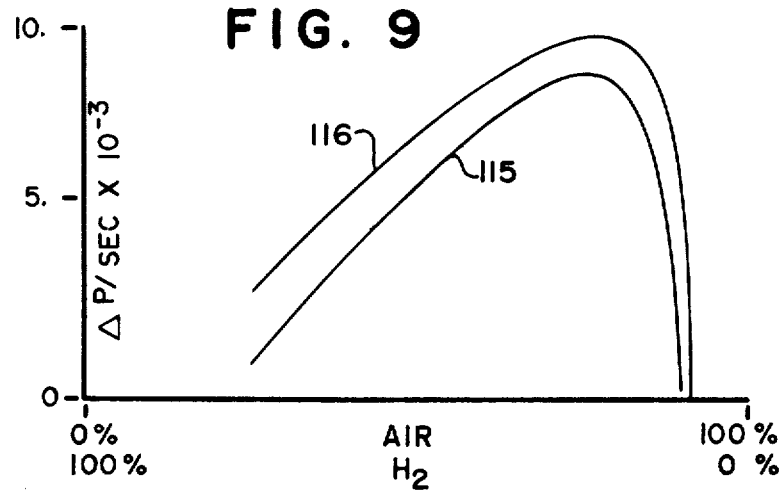
FIG. 9 is a plot of the reaction rate versus the percentage composition of a gaseous mixture which has been reacted within the pneumatic chamber of a tire.
Figure 10:
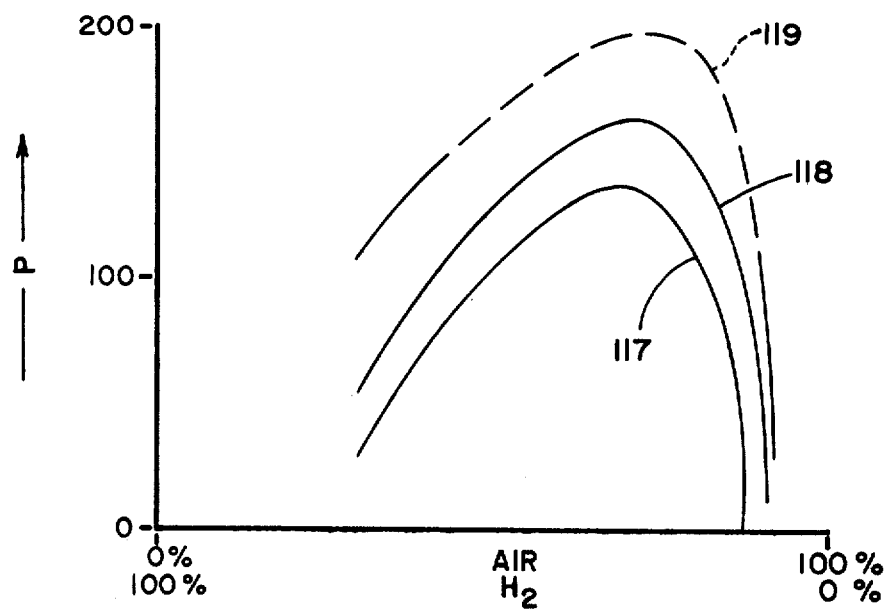
FIg. 10 is a plot of maximum pressure build-up expressed as a force per unit area.

Looking now to the details of FIGS. 9 and 10, and in particular FIG. 9, wherein a plot of reaction rate versus the percent composition of the explosive mixture is set forth, it will be appreciated that the curve of FIG. 9 depicts the rate of reaction pressure build-up as a function of reactant composition or charge initially placed within the tire inflation chamber. Hence, the plotted values found in FIG. 9 are the slope of the P2, P5 pressure build-up line found in FIG. 7. It will be observed that the maximum pressure build-up rate is effected by a reactant composition of 75 percent air and 25 percent hydrogen. The curve 115 represents an initial charge of 24.7 psia, while curve 116 represents a reactant charge pressure of 28.7 psia prior to detonation.

In FIG. 10, the P6 values of FIG. 7 are presented for a reactant provided by a combustable mixture of air and hydrogen, with the curve having a form similar to that presented in FIG. 9.

Curve 117 represents an initial reactant charge prior to combustion of 24.7 psia, while curve 119 (extrapolated) was caried out at 36.7 psig. Curve 118 represents a reactant charge of 28.7 psia.

Looking now to the details presented in FIG. 11, wherein there is disclosed apparatus 10 for carrying out the method in accordance with the present invention. The apparatus comprises structure 11, which can be in the form of a wheel of usual design, modified as hereinafter explained, and upon which a pneumatic tire 12 can be mounted. Where deemed desirable, the wheel can be in the form of split members held together by hydraulic rams or the like so as to enable rapid mounting and dismounting of the tire for continuous test purposes.

Apparatus 13, more fully disclosed hereinafter, instantaneously senses and records any change in pressure signal measured within the inflation chamber of the tire. The detector apparatus is affixed to the interior of the tire by any convenient means such as indicated by the numeral 14. An ignitor, such as a glowplug 15, is affixed to the wheel and connected to a suitable source of current 16. Tire inflation flow conduit connection 17 enables the fill gas or reactant to be placed within the pneumatic inflation chamber of the tire. A valve 18 can be interposed between the tire chamber and the manifold connection 19 to prevent backflow, if desired. Flow conduit 20 is connected by valve 21 to a source of dry hydrogen gas stored under pressure at 22. Flow conduit 20' is connected by valve 23 to a source of dry oxygen stored under pressure at 24. Flow conduit 20 is connected by valve 25 to a source of dry air stored under pressure at 26. Flow conduit 120 exhausts to atmosphere through valve 27, while flow conduit 220 is connected to a vacuum source by means of valve 127.

FIG. 12 illustrates an alternate form of the apparatus previously described in conjunction with FIG. 11. As seen in FIG. 12, the tire to be tested for defects is arranged within an explosion-proof chamber 112 comprised of a heavy metal casing for catching significant tire particles therewithin. The before mentioned glow plug is connected at 115 to a suitable source of current through the illustrated switch. Electrical conduit 114 connects the pressure transducer or sensor 14 to an instrument tape recorder 46. The tape recorder can subsequently be connected to the strip chart apparatus 47 which enables the signal to be visually analyzed at any subsequent time. Instrument 48 can be connected to the tape recorder to enable the profile of the recorded signal to be visually analyzed.

In FIG. 13, the relative location of the pressure transducer, glow plug, and fill inlet may be arranged as desired. It is preferred to arrange the transducer 180° about the wheel rim relative to the glow coil, or alternately, closely adjacent to one another. The glow plug has the usual central electrode 36 suitably insulated as seen at 37 so that the resistance element 38 can be electrically connected to the central electrode and to a ground at 39.

The pressure transducer apparatus 14 is comprised of electrical leads 40 connected to the illustrated element within chamber 41 so that movement of diaphragm 42 causes an electrical signal to be produced within the leads. Chamber 43 is affixed to the wheel rim by conduit 44 with the conduit having an open end 45 in communication with the tire inflation chamber.

In FIG. 14 there is disclosed a tire 12 of usual design, having spaced beads 28 to which the tire body 29 is affixed. The tire body includes one or more plies 30 which enclose a tire inflation chamber 31 when the tire is suitably mounted upon a wheel means. A tread wearing compound 32 is carried by the ply structure. The side wall is illustrated by the numeral 33.

As seen in FIGS. 14 and 15, the ply 30 is comprised of tire cords 34, which usually is comprised of a plurality of filaments 35, with the cords being made into the ply.

Figure 16:
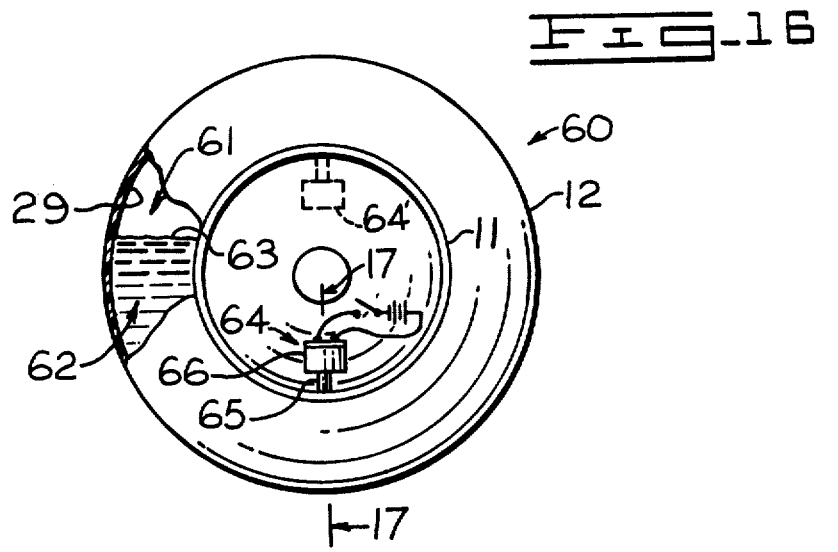
FIG. 16 is a view similar to FIG. 11, which discloses another embodiment of the present invention.

In FIG. 16, a pneumatic tire testing assembly 60 has been arranged with the tire chamber 61 being partially filled with liquid 62, thereby providing a liquid level 63. A controlled dynamic force is provided for the chamber by the provision of an apparatus 64 for detonating an explosive charge placed in communication with the tire interior 29. Specifically, a gun barrel 65 having an electrically actuated shell loading breach 66 is suitably attached to the tire rim or wheel in the illustrated manner of FIGS. 16 and 17. Seal 67 prevents fluid flow past the blank shell 68. A plastic or wax seal can be used as indicated at 167 where the shell body is incompatible with the fluid 62. Electrical conduits 69 enable remote control over the shell primer device.

In FIG. 16, the dot-dash diagrammatical illustration at 64' indicates that the explosion can take place in either the liquid or the gaseous phase.

Figure 18:
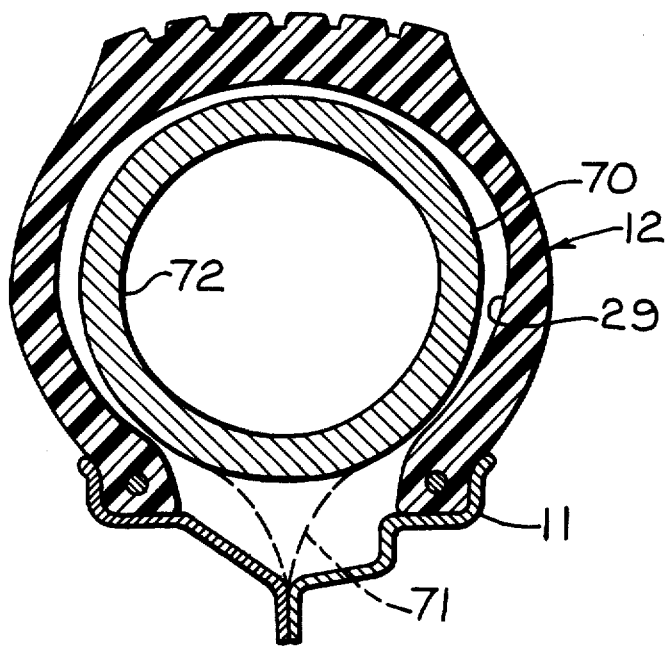

In FIG. 18, numeral 70 illustrates one means by which the volume of a tire chamber can be effectively reduced in capacity so far as regards the amount of fill gas. A toroidial shaped metal or plastic member 70, which may be either solid or hollow as seen at 72, is placed within the tire chamber, and attached at 71, if desired.

In the embodiment of FIG. 11, the glow plug must at times extend to the tire crown and be at the 12 o'clock position when working with tires filled almost full with water.

Flow line 220 can be used as a water line to fill a tire completely or partially with water. Provision can be made through inlet 17 for releasing entrapped air when filling with water and also for the level of water required for specific ratios of air to water. The position of 17 is regulated by the water volume requirements.

The present invention enables hidden defects in pneumatic tires to be determined by exerting a force within the pneumatic chamber which is proportional to the force to which the individual cords are subjected during one rotation of the tire. The time duration as well as the magnitude of the force to which the individual cords of the tire are subjected is duplicated by controlling a combustion reaction within the tire so that the resultant explosive force effected within the pneumatic tire chamber is at least equal to the force encountered by the tire as it rotates through its footprint.

The times for the pulse force transmittals of a cord within a rotating tire are of the same magnitude encountered in some explosive reactions. The explosive nature of various hydrocarbons admixed with oxygen or air are known to those skilled in the art. Table IV lists several common hydrocarbons along with some of their inherent properties. In addition to hydrocarbons, hydrogen and carbon monoxide are also included therein. From a standpoint of availability, volume of gas required for inflating tires, the ease with which precise mixtures of gases can be controlled, and the relatively low amount of heat liberated by the combustion of a cubic foot of gas, hydrogen appears to be the most desirable of the many different available explosive agents.

The hardware required for carrying out the present invention is illustrated in the before discussed Figures and include:
1. Cylinder hydrogen equipped with a suitable pressure regulator and fill hose line.
2. A source of dry compressed air.
3. An electric resistance heating element to ignite the reaction.
4. A means for controlling and sensing the fill inflation pressures.
5. A pressure sensing device for monitoring the combustion.

6. An instrumentation recording device to permit subsequent analysis of the combustion.

Specifically the availability and identification of the equipment used in FIGS. 11–13 is as follows:

46:2 Tandberg Instrumentation Tape Recorders Series 100 (TIR 100)

Tandbergs Radiofabriki A.S., Oslo, Norway 4 channel, FM, ¼ inch tape, 7 inch reel (FM system conforms with IRIG Standard Document 106–66 Intermediate Band) 3 speeds: 1 ⅞ IPS, 3 ¾ IPS, 7 ½ IPS 14: 2 Setra Systems Model No. 200 Pressure Transducers Setra Systems, Inc., 12 Huron Drive, Natick MA 01760

2 PMC UNI-76 Power Supplies

Power/Mate Corp., 514 S. River St., Hackensack, N. J. 07601

21–25:3 ASCO Solenoid Valves No. 8262C22 ¼ inch pipe thread ⅛ inch orifice 135 psi operating diff., 500 psi body press Automatic Switch Co., 50–56 Hanover Rd., Florham Park, N. J. 07932

47:1 Dixson Digitest 750 Digital Multimeters

Dixson Inc., P. O. Box 1449, Grand Junction, CO 81501

1 Techni-Rite Model 7100 ¾ IPS & 6 IPM
1 Techni-Rite Model 7100 25 mm/sec 50 mm/sec
1 Techni-Rite Model TSC-810 Signal Conditioner Techni-Rite Electronics Inc., Technirite Industrial Park, East Greenwich, R. I. 02812

For controlling the inflation of the tire, the various electronic device of the present invention is assembled in the illustrated manner of FIGS. 11 – 13. The flow valves are arranged to control, respectively, the hydrogen fill line, the air fill line, the oxygen fill line, and the gas release line respectively, to the tire. The internal pressure of the pneumatic chamber of the tire is monitored through means of the pressure transducer whose output signal is fed to the digital voltmeter. The internal tire pressure is calibrated relative to the voltage output of the pressure transducer so that the pressure can be monitored continuously through the digital voltmeter. The tire valve connection is placed in the flow line thereby enabling the tire pressure to be measured using any suitable pressure gauge.

In carrying out the invention in accordance with the embodiments of FIGS. 11 and 12, the tire to be tested for hidden defects is mounted upon the wheel means with the pressure transducer 14, the igniter 16, and the reactant inflating means 18 being suitably affixed thereto. The various illustrated solenoid actuated valves are suitably manipulated so as to cause gaseous reactant of a predetermined percentage composition of oxidant and reducer to flow into the air chamber of the tire. Valve 18 is closed, the recorder 46 energized, and the glow plug actuated to cause ignition of the combustibles contained within the tire chamber. The resultant explosion is recorder at 46 while simultaneously being observed at 48, if desired.

The recording tape 46 can be subsequently transferred onto a strip chart 47 at various amplifications and speeds of the signal from the tape so as to enable complete anaylsis of the profile of the explosive force, such as seen illustrated in FIGS. 7 and 8.

Figure 8:
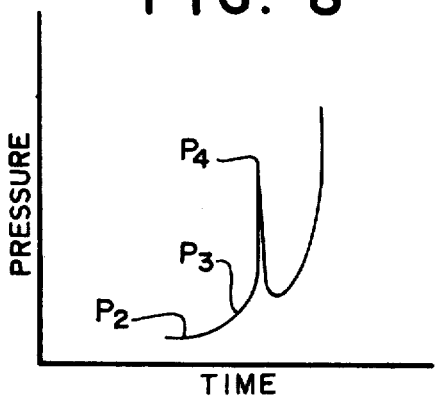
FIG. 8 is an enlarged detail of part of the curve disclosed in the plot of FIG. 7.

As seen in FIG. 7, pressure P3-P5 may not readily be detected until the magnification of FIG. 8 is reached, and the spike pressure is not definable at all until real time has been expanded 16 times with the trace at 50 mm per second. Similarly, the rate of pressure rise is so rapid that the rise time cannot be properly determined until at least a 16 fold time magnification in real time is achieved at a strip chart speed of 50 mm/sec. The time interval ($t_2 - t_1$) also requires proper magnification in order to enable its magnitude to be determined with any marked degree of accuracy.

The increase in pressure from p5 to p6 is probably a reflection of the increase in the volume of the tire in response to the pressure build-up brought about by the heat liberated in the reaction:

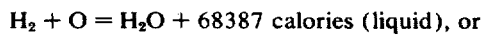

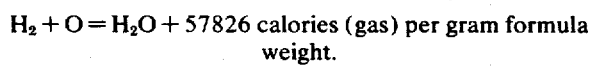

The vertical displacement of p8 to p9 may be the result of the heat effect upon the electronics of the pressure transducer when the tire is opened to ambient conditions after a combustion experiment. This shift essentially disappears in experiments where the pressure sensor is under water. The p7 decay curve may be influenced by heat affecting the pressure transducer. It is noted that irregularities in the p7 curve in the gas phase are reflected similarly but to a much greater extend in the p7 curve obtained in a water media. The p6 values are higher for water immersed pressure sensors in comparison to pressure sensors placed in the gas phase and it is postulated that such differences are due to the size of the small orifice which must pass a certain volume of gas through it, in order to actuate the pressure sensing elements. Since water is non-compressible, and pressure sensors respond absolutely to change in pressure it follows that sensors placed in a gas media are affected by the media.

The spike pressure shown in FIGS. 7 and 8 is the result of a shock wave traveling at a speed of 5 cm per millisecond. The shock wave is very thin, being only 0.4 milliseconds in time duration for the usual spike. In order to define spike pressure p4 with precision it is necessary to expand the tape recording real time at least 64 times for the spike to be able to reach its peak. Expansion to 256 times real time shows another 10 percent increase in magnitude of spike pressure p4 accompanied by a possible reduction of the pressure wave thickness to 0.38 milliseconds (380 microseconds).

Spike pressures have not been observed in water media though they could very well be present, and may be found by expanding the electrical signal the requisite degree.

The amount of hydrogen and air in stoichiometric ratios to inflate a passenger tire of size F78-14 (7.75-14) to 28 psig has enough of the reactants present to liberate 68,000 or more calories of heat energy. This amount of heat is sufficient only to raise the temperature of the mass of the tire about 15° F.

FIG. 9 shows the reaction rates experienced as the air-hydrogen mixture is altered, and as the amount of charge is varied. The rate of combustion is most rapid at the mixture quantities developing the most force with the maximum rate of combustion occurring near the stoichiometric optimum. Finite easier control of the combustion rate appears to be more feasible in the hydrogen rich compositions as compared to the air rich compositions.

FIG. 10 discloses the maximum pressure build up as a function of the air-hydrogen composition and the amount of charge initially placed in the tire chamber. The values plotted are the p6 pressures of FIG. 7. It is evident that the maximum pressure build up occurs at a composition of about 75 percent air and 25 percent hydrogen which is close to the stoichiometric ratio of 70 percent air and 30 percent hydrogen for complete combustion. The maximum force pressure generated drops off sharply at the greater percentage of air and less rapidly as the hydrogen content is increased. At the terminus points of the curves the region is reached where no combustion is effected. As the charge is increased the magnitude of the resultant force increases.

EXAMPLE

Both the time and magnitude of hydrogen-oxygen mixture combustions can be easily controlled and regulated to simulate pulse forces within tires under any condition of applied service condition. This is particularly true as regards the time interval, C – D of FIG. 2, as the tire moves out of its footprint. Since the nominal maximum magnitude of the tension change in going from C to D is from zero to the tension imparted by the inflation pressure, it is desirable to know the value of the inflation tension. A conventional G78–15 tire having two plies in its body with 11 cords per inch disposed at an angle of 40° to the great circle path and an inflation pressure of 28 psi has a cord tension of from 9 to 13 pounds dependent upon the curvature assumed for $R_B$ where $R_B$ depends upon the presence of a belt incorporated within the tire. A factor of safety of 4× is considered adequate. Since cord tension is related to the inflation pressure a controlled combustion generating 112 psi at a rate of 8.7 psi per millisecond (13 ÷ 1.5) yields the desired criteria for a quick, fast determination of the tires adequacy. Under this specified condition a pulse force of 52 pounds is imposed upon each cord at the rate of increase occurring with an 8.7 psi increase in pressure build up per millisecond. The condition being duplicated is equivalent to a speed of 120 mph where the time interval C to D of FIG. 2 is 1.5 milliseconds, and with the further assumption that Point C is at zero tension at the midpoint of the footprint. The 8.7 psi increase in pressure build up per millisecond characterizes the yank with which the change in tension forces is applied. The reactant charge required to give the necessary pulse force is 8.5 psia stoichiometric mixture of hydrogen and oxygen. This mixture includes 10.7 psia of nitrogen present in the air used to oxidize the reaction. Hence, the reactants are 5.7 psia of hydrogen and 13.5 psia of air. The determination was carried out at an elevation of 4,000 feet at an atmospheric pressure of 12.7 psia; therefore, the tire must be pressured to 0.8 psig with air, followed by hydrogen to a final pressure of 6.5 psig before ignition.

With the reactants as described the spike pressure p4 is 41 psi which corresponds to a pulse force of 19 pounds applied in about 250 microseconds. This corresponds to a very rapid acceleration of a vehicle. It is postulated that the pulse force corresponding to the A – B rise of FIG. 2 or the counterparts in FIGS. 3 and 4 is more comparable to the spike pressure p4 than to the true pressure p6. However, should the pressure p6 be more applicable to the pulse force A – B, then this application of a pulse force can also be duplicated by reference to the various tables.

While the combustion reaction is of a relatively small but sharp intensity, it is of sufficient magnitude to result in a defective tire's failure.

EXAMPLE

The reactant charge was kept low at 5.7 psia of hydrogen and oxygen in stoichiometric quantities and yet this tire failed under these very light conditions. The subject tire was a used one with considerable mileage accumulation on it from a previously monitored road performance test. While the tire failure resulted in revealing a defect in the ply structure, another tire also failed at a similar very low reactant charge level due to bead wire breakage. When the broken bead wire ends were examined it was noted that all but one wire had been previously broken in service.

EXAMPLE

A new 4-ply nylon tire was subjected to 17 individual explosions prior to rupture. The intensity of the 17 explosions were progressively increased from 103 psi (p6) to 174 psi in order to induce failure or to find the weakest point.

In another new 4-ply nylon tire, 89 explosion experiments were required before it ruptured. This is Tire No. 4 identified in Tables V, VI, VII, and VIII. From the series of experiments conducted on this tire, it is concluded that no damage accrues to a sound tire as a result of contained explosions, and the tire does not fail until the nature and magnitude of the pulse ruptures the weakest spot in the tire at which time the tire then is completely destroyed.

In the 4-ply nylon tire, No. 5 of Table V, which was more than one-half worn at the time the explosion reactions were conducted, the tire sustained no damage as a result of three previous explosions, yet the tire failed during the fourth test due to bead wire rupture at four different locations within the same bead bundle.

A 2-ply rayon tire was run for several thousand miles in a controlled road test in 1968. At that time, the road performance test had been discontinued for this tire since a separation between the tread and top ply was evident as a 2 inch blister. The tire ruptured at this blister at a p5 pressure of 162.9 psi and a spike pressure p4 of 92.2 psi. Both of these values are exceedingly high as is the reaction rate of 33.3 psi increase per millisecond. Since the tire had a known defect prior to explosive rupture, it is probable that the intensity of the reaction rate as compared to the small defect enabled the pressure build-up within the tire to continue unabated even though its build-up was being partially dissipated through the defect. The reaction response time of this tire to the explosion might have been impaired by its age.

Two new and six used tires in 13 inch and 14 inch and 15 inch sizes were dynamically strength tested in accordance with the present invention. The tires included a 4-ply polyester bias (F78-14 new), 4-ply nylon bias (8.25-14 used), two steel tread plies on two rayon body plies in a radial construction (175R13 used), and six rayon tread plies on three rayon body plies in a radial construction (215SR15 used). The dynamic strength test was carried out using stoichiometric mixtures of hydrogen and air at the charge level of 8.5 psia (6.5 psig total). P6 pressure build-ups were observed to be 108.3, 112.1, 95.2, 104.9, 131.8, 133.0, 133.0, and 133.8 psi, respectively, for the two tires of each construction identified above. The p5 inflection points were 87.9, 90.9, 61.0, 89.5, 90.3, 92.9, 95.3, and 102.9 psi, respectively. The tires were placed in service on three different vehicles in different types of service applications. The 215SR15 used radial tires were run over freeways and highways at speeds up to 85–90 mph, while the remaining tires were run entirely in stop and go city driving on city streets as well as on the interstate highway going through the city center. The tires were rotated systematically between front and rear positions and monitored at prescribed mileage intervals. One of the 215SR15 tires had a 1 inch cut in the tire sidewall rubber 2 inches above the bead with the cut extending to but not into the cord in the sidewall. Visual inspection showed that the other 215SR15 tire had a separation at the belt edge which ordinarily would have excluded the tire for retreading purposes; and hence, the tire was suitable for use only for experimental purposes. This cut would have eliminated this tire from retreading except for purely experimental reasons. After 1 month of operation, the road vehicle with the 215SR15 used tires had run 15,000 miles while the remaining six tires in city service had each run about 7,000 miles without experiencing any tire problems. It is evident that the tires were uninjured as a consequence of their having undergone the dynamic strength test.

Thus, it appears that an upper limit of the combustion reaction rate should not be exceeded when evaluating tires for their strength. In those tires having undergone considerable hardening during aging the pressure build-up is regulated partially by the tires' inability to respond to the explosive force and this identical situation exists in age hardened tires when subjected to pulse forces in transmitting power in actual service.

For tires weakened by previous service usage the explosive force required to cause an already weakened tire to rupture at its weakest point is relatively small in comparison to the force required to rupture a new tire with its high initial strength. In service, only 7.5 percent of the tire cords work at any one time (the cords in the footprint) a failure presents no particular problem because the energy involved in the failure is low. However, when each and every cord within the tire body is simultaneously tested, approximately 30 times as much work is being done at any instant in comparison to the situation existing in service usage.

EXAMPLE

An 8-ply 12-ply rating 10,00-20 truck tire with 10 cords per inch lying at an angle of 40° to the great circle line results in a calculated tension of 9 pounds per cord. A tractor trailer rig with 18 tires on the ground accelerating at 1 ft/sec$^2$ places a force on each drive axle tire of 280 pounds which divided between an estimated 600 cords tied to the footprint at any instant, amounts to one-half pound pulse force per cord. For each increase in acceleration of 1 ft/sec$^2$ the pulse force increases by a corresponding half pound. Accordingly, pulse forces are considerably lower in truck tires than in passenger sized tires, except possibly during vigorous braking. At 60 mph the time required to go from C to D of FIG. 2 is about 3-½ milliseconds. Reactant mixtures were metered into a 9–22.5 10-ply rated nylon truck tire containing 072.5 percent and 99.17 percent volume by water covering a range of explosive intensity from 35 to 250 psi being delivered in from 1 to 3 milliseconds. Dependent upon the volume of water in the tire the combustion ranged in magnitude from 400 to 6,7900 calories. The tire underwent no deterioration attributable to the controlled combustions by visual examination.

Table V reports the influence of the size of the reactant charge upon the internal pressure developed as a consequence of the combustion reaction of hydrogen with oxygen in air. A value of 5.7 psia for hydrogen and oxygen is composed of 3.8 psia of hydrogen plus 1.9 psia of oxygen to which is added 7.1 psia of nitrogen present in the air to give a total of 12.8 psia or 0 psig since the work was conducted at a 4,000 foot elevation with its attendant decrease in atmospheric pressure.

The experiments reported in Table VI were designed to investigate the influence of nitrogen dilution at four reactant levels upon the magnitude and quality of the combustion reaction. In general, an increase of nitrogen dilution results in higher p5 inflection and maximum p6 pressures being developed but the increase in pressure becomes smaller as the reactant charge level is increased.

The experiments reported in Table VII illustrate the influence of air dilution upon the magnitude and quality of the combustion at two different reactant levels. The use of air dilution results in an increase in the true pressure generated with the increase becoming smaller as the reactant charge is increased.

Table VIII reports the influence of hydrogen dilution upon the combustion characteristics at two different reactant levels. Hydrogen appears to be less effective than nitrogen but more effective than air in suppressing the combustion of hydrogen and oxygen.

Table IX reports the influence of water being used to fill some of the gas phase in order to decrease the amount of reactant and hence the total amount of energy required to generate required pulse forces. This table also reports apparent differences in measured pressures in gas and liquid environments. Transposing the pressure sensors from the gas to the liquid phase yield similar data.

The procedures outlined herein are effective for studying new tire strengths as well as for evaluating strength of used tire casings for a go no-go type acceptance-rejection. The technique is particularly useful for ferreting out deficiencies in construction or compounding at great saving in road and indoor wheel performance test costs. Tires fail at their weakest point and the simultaneous subjection of all cords to a tension force increase being applied with a yank automatically singles out the weak area of the tire. The use of the present technique to eliminate the defective unsafe tires from reaching the public by testing every tire for a minimum strength level on the production line eliminates a prime source of customer difficulty.

The remaining gases of Table IV which are best suitable for employment in carrying out the present invention were evaluated. As an example of the use of acetylene, the tire was filled with a gaseous explosive agent comprised of a 7 percent composition acetylene and 93 percent composition air at zero psig. The gaseous mixture was ignited and the resultant explosion provided a P6 of 85.4 psi, with a slope of 1.73 psi/millisecond.

In another example, 12.5 percent composition propane was admixed with oxygen and the tire chamber pressure reduced to zero psig. Ignition of the gaseous reactants destroyed the tire, giving a spike pressure 329 psi and a P6 of 158, which is considered to be the rupture pressure. The results were in the form of a very irregular curve.

In a series of tests involving methane, considerable difficulty was experienced in obtaining ignition of a gaseous mixture of methane and air. By the employment of a white hot filament and a reactant compresed of 14 percent composition methane and 86 percent composition air, a deflection corresponding to 78.6 P5 and 104 P6 having a slope of 1.6 was obtained.

Hydrogen with either air or oxygen is the most desirable of the reactants while acetylene and propane are likewise suitable, but do not have the before mentioned advantages of hydrogen. Carbon monoxide is a suitable reducing agent; however, it is dangerous to handle for obvious reasons. Methane is not as desirable as the before mentioned gases because of its narrow explosive range and because of the difficulties of ignition of a mixture of methane and air.

Should a perfect tire be subjected to a series of explosions of progressively increasing force, an explosive force ultimately will be attained which will cause failure of the tire. Such a hypothetical tire would disintegrate because it would have no weak point or hidden defect which could prematurely fail. However, a perfect tire has yet to be found in actual practice and accordingly, in a tire dynamic strength test, there will always be some weak point in the tire structure which will fail in advance of the remaining tire structure. In a tire dynamic strength test where both the rate and magnitude of pressure increase is finitely controlled, the energy released by the combustion reaction will yank each of the cords of the tire simultaneously. As long as this pulse force magnitude and/or rate of force application is less than the structural integrity of the weakest point within the tire, the tire remains unaffected by the explosive force. No permanent damage will be incurred by a tire which is subjected to any pulse force which falls short of rupturing the weakest point within the tire.

For example, assuming that a tire has been screened in accordance with my U.S. Pat. No. 3,563,088 and found to have excessive non-uniformity at a specified location about its equatorial plane. The screened tire, because of the non-uniformity, can be predicted to have a weak point which coincides with its maximum measured non-uniformity and greatest effective inflated cord tension. Assuming a controlled explosion liberating 22,000 calories of heat is equivalent to the explosive force required to rupture the weakest spot, and that the remainder of the tire is structurally sound and can withstand a pulse force imparted by 40,000 calories of combustion reaction, it follows that the higher strength level exhibited by the major part of the tire body is of little value because of the lower strength value of the weakest spot.

More specifically, assume that an E78-14 size tire is to be tested for its ability to negotiate the Kansas Turnpike at 80 mph on a hot day, and that it is determined that a pulse force equal to 112 psi at 8.7 psi increase per millisecond is required for this condition. A charge of hydrogen and air equivalent to a pulse force of 36,000 calories of heat is selected to provide this equivalent pulse force. Should the tire have a hidden defect, such as a damaged bead or a damaged side wall, and that the weak spot can withstand only 10,000 calories of heat energy before rupturing, it follows that the excess 22,000 calories of energy must erupt through this weakest point in the tire. On the other hand, should the weak spot have a strength which will withstand 31,000 calories of heat energy, the remaining 1,000 calories of heat energy would be excessive and would be lost through the ruptured spot in the tire which represents its weakest point.

However, should the weak spot have a structural integrity which will withstand 33,000 calories of heat generation, then it follows that the tire would survive the test and that it would be suitable for the recited service application.

When the energy released by the controlled combustion reaction of the present invention yields a pulse force having a rate and magnitude which exceeds the structural integrity of the weakest spot, each individual cord of the tire body undergoes a pulse of the same magnitude of energy including the cords or rubber planes which ruptures in the weakest spot. Assuming that the weakest spot represents only 5 percent of the cords of the tire, and since the tire ruptures before the maximum pressure build-up is effected within the tire chamber, the unused energy of the reactants will exit through the damaged area of the tire, thereby blasting a bigger hole through the already ruptured area of the tire.

There is an extremely remote possibility, yet to be experienced, of exactly balancing the total energy released by the combustion reaction with the energy required to individually stress each cord, wherein a few of the cords, or their rubber encasement, have a breaking strength or capacity to respond to the rate of force application which is barely below the value of the pulse force. As previously pointed out, it is more probable that this hypothetical balance point will either be exceeded or never reached. If it is not attained, the tire will not be injured. If it is exceeded, the excess energy will effectively destroy the tire. But if this exact balance of force and cord strength is achieved wherein insufficient energy remains from the explosion to destroy the tire, it is possible that the tire will sustain a slight injury adding or weakening the before mentioned weakest point as a consequence of the instant controlled combustion reaction.

As pointed out above, all tires other than a perfect tire are inherently fabricated with a weak section. If the weak section is one whose structural integrity is sufficiently high to enable the tire to survive until it has been completely worn out, then such a weak section is not considered a hidden defect. On the other hand, should the structural integrity of the weakest point exhibit characteristics indicating that it will fail under normal anticipated usage during its useful life, then this weakest section becomes a hidden defect which will be revealed by the present invention. More specifically, should it be determined that a combustion reaction which will release 95,000 calories of energy is required in order to duplicate the most severe condition of anticipated useage, and should the tire chamber subjected to the reaction have a weak spot which will fail in excess of 45,000 calories, while the remainder of the tire has a structural integrity which fails at a value in excess of 95,000 calories of energy, the excess of 50,000 calories of energy will rush through the initial weak spot in the tire causing further tire damage and evidencing the location of the weak spot because of the visually detectable injury the tire has sustained as well as being evidenced by the release of pressure from the tire chamber.

It is therefore desirable, when determining the absolute strength level of a tire, to increase the total energy released in the combustion reaction by relatively small increments which progressively increase until rupture occurs.

It is sometimes desirable to reduce the quantity of explosive gaseous reactants required in the tests by partially filling the tire with water so as to leave a gas filled chamber in communication with the ignitor. Upon ignition, the explosive force is effected upon the tire wall as it travels from the gas chamber into the water and into the tire wall wetted by the water while the tire wall forming the gas chamber is directly effected by the expanding gases. This expedient is especially useful in testing large truck and earth moving vehicle type tires where the large quantity of gaseous explosive agent is reduced for reasons of economics and safety. Water is mentioned as a convenient agent to employ to reduce the internal gas volume of a tire. Alternatively, a non-compressible core could be designed to be used alone or in conjunction with an extensible membrane wherein the combustion gases are sealed in the annular ring between the core and the tire itself thereby permitting reduced amounts of reactants to be employed.

When working with a small gaseous phase it is convenient to fill the tire chamber with liquid, such as water, to zero psig, and then to inject the gaseous mixture, such as air and hydrogen, in the required amount followed by additional liquid as may be required to attain some predetermined pressure of the gaseous reactants.

Figure 17:
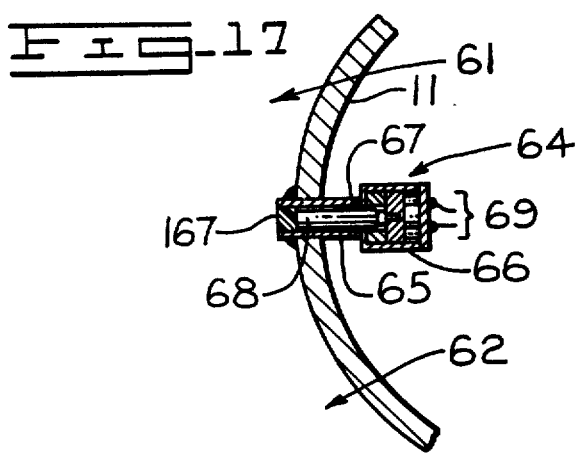
FIG. 17 is an enlarged, fragmentary, part cross-sectional view of part of the apparatus disclosed in FIG. 16, and taken along line 17—17 of FIG. 16; and, FIG. 18 is a cross-sectional view of a pneumatic tire which sets forth one of the important teachings of this invention.

The above expedient is illustrated in FIGS. 16-18 of the drawings. Where is it deemed desirable to incorporate a large incompressible area within the tire chamber and at the same time minimize the liquid requirements, a metallic or non-metallic core 70 can be placed within the tire chamber. As seen illustrated at 72 in FIG. 18, the core can be hollow if weight reduction is considered advantageous. The core can be supported at 71 by the wheel. The member 70 can be made collapsible so that it can be expanded after installation where time is of essence.

In another embodiment of the invention, it is further possible to arrive at a test similar to the gaseous explosion embodiment by the provision of an explosion brought about by the use of pyrotechnics. As for example, a cartridge containing gun powder which is mechanically or electrically detonated. The cartridge is placed within or in communication with the tire chamber with means extending from the tire for enabling actuation of the detonator. The tire chamber can be partially or completely filled with either a compressible or an incompressible fluid as for example, water or air, depending upon the size of the explosive charge relative to the size of the tire chamber and the explosive force desired to be affected upon the plies of the tire.

As seen illustrated in FIGS. 16 and 17, the explosive charge can be in the form of a blank cartridge, a blank shotgun shell, or a slow reacting charge and detonator assembled in a manner similar to that required of a blasting cap with the explosion force being selected by controlling the composition and size of the solid reactant.

Gunpowder is available in many different varieties possessing different burning rates and energies with a heat content of 0.72 to 0.75 kcals per gram. A 10-gauge shotgun shell blank has 8 drams loading equivalent to 14 grams of gunpowder while a 12-gauge blank shell has the equivalent of 10-½ grams of gunpowder. Thus, the use of pyrotechniques to furnish the necessary energy to give desired pressure increases resulting in the required pulse forces is confined to small gaseous volumes. This necessitates the use of a solid or liquid displacement of part of the contained tire volume in order that the packaged solid fuel can be kept at reasonably low levels. It is evident from Table IX that even high load range large truck tires can be dynamically strength tested on a go no-go basis using small packaged solid energy sources such as gunpowder when used in conjunction with water displacement of a large portion of contained tire volume.

A pneumatic tire's ability to support a weight load depends essentially upon two factors: the number and strength of the individual cords built into the tire body and the amount of inflating gas injected into the chamber of the tire. Analysis of the Tire & Rim Association load-inflation tables reveals that for each percent increase in absolute inflation pressure, above the minimum listed, the permissible weight load increases the following percent, also above the minimum value listed.

| | |
|---|---|
| All passenger tires | .9864 |
| Light Truck Single tires | .9828 |
| Light Truck Dual tires | .9828 |
| Heavy Service Truck Single tires | .9898 |
| Heavy Service Truck Dual tires | .9827 |
| Wide Base Single tires | .9722 |
| Wide Base Dual Tires | .9723 |

In view of this finite and established relationship for permissible commercial practice for pneumatic tires, it is evident that the inflation pressure alone may be used as a base for establishing a go no-go type of dynamic strength test, for separating tires of potentially low strength from tires having an adequate dynamic strength level. One reasonable screening level is four times the recommended inflation pressure with the pressure being nominally applied in 10 milliseconds or less for a passenger tire, and in 50 milliseconds or less for a truck tire.

Table I

TREAD FOOTPRINT AS % OF CIRCUMFERENCE FROM ROLLING RADIUS

| | 2 PLY O.E. BIAS | | BELTED RADIAL | |
|---|---|---|---|---|
| INFL psi | 950 lb LOAD | 1230 lb LOAD | 950 lb LOAD | 230 lb LOAD |
| 18 | 8.88 | 11.30 | 9.33 | 10.34 |
| 28 | 8.10 | 9.07 | 7.03 | 8.82 |
| 50 | 6.75 | 7.25 | 5.88 | 6.67 |

TABLE II

| VEHICLE SPEED MPH | SECONDS /MILE | MILLI-SECONDS /TIRE REVOLUTION | MILLI-SECONDS IN FOOTPRINT | MILLI-SECONDS C TO D | MILLI-SECONDS A TO B | |
|---|---|---|---|---|---|---|
| 120 | 30 | 40 | 3.00 | 1.50 | Prob. | <0.5 |
| 110 | 32.73 | 43.64 | 3.27 | 1.64 | " | " |
| 100 | 36 | 48 | 3.60 | 1.80 | " | " |
| 90 | 40 | 53.33 | 4.00 | 2.00 | " | " |
| 80 | 45 | 60 | 4.50 | 2.25 | Prob. | <1 |
| 70 | 51.43 | 68.57 | 5.14 | 2.57 | " | " |
| 60 | 60 | 80 | 6.00 | 3.00 | " | " |
| 40 | 90 | 120 | 9.00 | 4.50 | Prob. | >1 |
| 20 | 180 | 240 | 18.00 | 9.00 | " | " |

TABLE III

| VEHICLE WEIGHT | INFL psi | % GRADE | SIMULATED WIND DRAG | 40 | 50 | 60 | 70 | 80 | 90 |
|---|---|---|---|---|---|---|---|---|---|
| | | | | VEHICLE SPEED-MILES PER HOUR | | | | | |

PULSE FORCE-LBS/TIRE-FUEL DRIVEN

| VEHICLE WEIGHT | INFL psi | % GRADE | SIMULATED WIND DRAG | 40 | 50 | 60 | 70 | 80 | 90 |
|---|---|---|---|---|---|---|---|---|---|
| 3150 | 28 | 0 | NO | .46 | .58 | .59 | .75 | .85 | .95 |
| 3150 | 17 | 0 | NO | .48+ | .52 | .59 | .72 | | |
| 3150 | 28 | 0 | YES | — | .92 | 1.12 | 1.37 | | |
| 4150 | 50 | 0 | NO | .61+ | .70 | .73 | .81 | .92+ | |
| 4150 | 28 | 0 | NO | .58 | .58+ | .60+ | .70 | .80+ | |
| 4150 | 28 | 0 | YES | .72 | .78 | 1.01+ | 1.25+ | — | |
| 4150 | 28 | 3 | NO | .88 | .97 | 1.02+ | 1.12 | 1.23 | |
| 4150 | 28 | 5 | NO | 1.02+ | 1.10 | 1.16 | 1.24 | 1.32 | |

MOMENTUM DRIVEN CONDITIONS

| VEHICLE WEIGHT | INFL psi | % GRADE | SIMULATED WIND DRAG | 40 | 50 | 60 | 70 | 80 | 90 |
|---|---|---|---|---|---|---|---|---|---|
| 3150 | 28 | 0 | NO | .17 | .22 | .28 | .34 | .41 | |
| 3150 | 28 | 0 | YES | .28 | .39 | .45 | .54 | — | |
| 4150 | 50 | 0 | NO | .19 | .25 | .31+ | .39 | .46+ | |
| 4150 | 28 | 0 | NO | .17 | .24 | .29 | .37 | .49 | |
| 4150 | 28 | 0 | YES | .24 | .34 | .43 | .52 | .62 | |

The simulated wind drag was obtained by pulling a small cargo parachute.

TABLE IV

| NAME | CHEMICAL FORMULA | MOLECULAR WEIGHT | SPECIFIC GRAVITY AIR = 1 | WEIGHT /FT$^3$ | BTU's/MOL GROSS × 1000 | BTU's/MOL NET × 1000 | BTU's/FT$^3$ at 60°F 30" Hg DRY GROSS | BTU's/FT$^3$ at 60°F 30" Hg DRY NET |
|---|---|---|---|---|---|---|---|---|
| Acetylene | $C_2H_2$ | 26.02 | .898 | .06858 | 562 | 543 | 1483 | 1433 |
| Butane | $C_4H_{10}$ | 58.08 | 2.0047 | .15309 | 1237 | 1142 | 3261 | 3010 |
| Carbon Monoxide | CO | 28.10 | .9665 | .07381 | 122.4 | 122.4 | 322.6 | |
| Ethane | $C_2H_6$ | 30.05 | 1.0371 | .07920 | 668.3 | 611.3 | 1762 | 1612 |
| Hydrogen | $H_2$ | 2.02 | .0695 | .00531 | 123.1 | 104.1 | 324.5 | 274.5 |
| Methane | $CH_4$ | 16.03 | .5534 | .04226 | 384 | 346 | 1012 | 912 |

| | THEORETICAL FLAME TEMP °F | FT$^3$/FT$^3$ FUEL GAS REQ FOR COMBUSTION AIR | FT$^3$/FT$^3$ FUEL GAS FLUE PRODUCTS $CO_2$ | FT$^3$/FT$^3$ FUEL GAS FLUE PRODUCTS $H_2O$ | FT$^3$/FT$^3$ FUEL GAS FLUE PRODUCTS $N_2$ | IGNITION TEMP °C IN ATM. AIR | INFLAMMABILITY IN AIR AT ATM.PRESS. ORD.TEMP. MIN | INFLAMMABILITY IN AIR AT ATM.PRESS. ORD.TEMP. MAX | DITTO DIFFERENT SOURCE MIN | DITTO DIFFERENT SOURCE MAX |
|---|---|---|---|---|---|---|---|---|---|---|
| Acetylene | 4770 | 11.96 | 2.0 | 1.0 | 9.4 | 406–440 | — | — | 2.5 | 80.0 |
| Butane | 3870 | 30.95 | 4.0 | 5.0 | 24.45 | — | — | — | 1.8 | 8.4 |
| Carbon Monoxide | 4475 | 2.38 | 1.0 | — | 1.88 | 644–658 | 16.3 | 71.2 | 12.5 | 74.2 |
| Ethane | 3820 | 16.67 | 2.0 | 3.0 | 3.17 | 520–630 | 3.3 | 10.6 | 2.9 | 13.0 |
| Hydrogen | 4010 | 2.38 | — | 1.0 | 1.88 | 580–590 | 6.2 | 71.4 | 4.0 | 74.2 |
| Methane | 3750 | 9.52 | 1.0 | 2.0 | 7.52 | 650–750 | 5.8 | 13.3 | 5.0 | 15.0 |

TABLE V

INFLUENCE OF REACTANT QUANTITIES ON RATE AND AMOUNT OF FORCE GENERATED STOICHIOMETRIC MIXTURES

| psia $H_2$ & $O_2$ | psig total | PSI FORCE inflection point $P_5$ | PSI FORCE maximum increase $P_6$ | SPIKE PRESSURE—PS absolute $P_4 - P_3$ | SPIKE PRESSURE—PS from atm. $P_4$ | REACTION RATE psi/millisecond | $t_2 - t_1$ milliseconds |
|---|---|---|---|---|---|---|---|
| | | | | TIRE No. 4 | | | |
| 5.7 | 0 | 35.5 | 75.9 | 8.6 | 20.8 | 2.33 | 6.3 |
| 7.5 | 4 | 50.2 | 96.8 | 26.9 | 38.0 | 7.52 | 5.3 |
| 9.1 | 8 | 63.6 | 121.3 | 26.9 | 44.1 | 9.7 | 3.9 |
| 11.0 | 12 | 73.5 | 138.4 | 30.6 | 46.5 | 11.5 | 3.5 |
| 12.7 | 16 | 98.0 | 158.0 | 41.6 | 69.8 | 16.4 | 3.0 |
| 14.5 | 20 | 115.1 | 170.3 | 26.9 | 51.4 | 15.5 | 3.8 |
| 16.3 | 24 | 138.4 | 185.0 | 36.9 | 63.7 | 16.4 | 5.0 |
| 18.1 | 28 | 133.5 | 193.5 | 39.2 | 68.6 | 15.5 | 3.8 |
| 18.1(1) | 28 | 150.6 | — | 66.1 | 93.1 | 21.7 | 3.5 |

TABLE V -Continued

INFLUENCE OF REACTANT QUANTITIES ON RATE AND AMOUNT OF FORCE GENERATED STOICHIOMETRIC MIXTURES

| psia $H_2$ & $O_2$ | psig total | PSI FORCE inflection point $P_5$ | PSI FORCE maximum increase $P_6$ | SPIKE PRESSURE—PS absolute $P_4 - P_3$ | SPIKE PRESSURE—PS from atm. $P_4$ | REACTION RATE psi/millisecond | $t_2 - t_1$ milliseconds |
|---|---|---|---|---|---|---|---|
| | TIRE No. 5 |
| 12.7 | 16 | 132.3 | 170.3 | 39.2 | 58.8 | 20.8 | 5.0 |
| 14.5 | 20 | 142.1 | 188.6 | 31.8 | 66.1 | 18.9 | |
| 16.3 | 24 | 154.3 | 199.7 | 31.8 | 68.6 | 19.6 | 2.8 |
| 18.1(2) | 28 | 156.8 | — | 49.0 | 75.9 | 19.6 | 3.8 |
| | TIRE No. 6 |
| 12.7(3) | 16 | 162.9 | — | 70.7 | 92.2 | 33.3 | 5.0 |

(1)Tire failed in a repeat run conducted in early morning where ambient and tire temperature was 50°F.
(2)Tire failed due to bead rupture during course of a series of runs.
(3)Tire failed during first run at ambient and tire temperature of 50°F.

TABLE VI

INFLUENCE OF NITROGEN DILUTION ON RATE AND AMOUNT OF FORCE GENERATED ALL EXPERIMENTS WITH TIRE NO. 4

| psia $N_2$ | psig total | PSI FORCE inflection point $P_5$ | PSI FORCE maximum increase $P_6$ | REACTION RATE psi/millisecond | $t_2 - t_1$ milliseconds |
|---|---|---|---|---|---|
| | REACTANTS: 7.4 psia of $H_2$ $O_2$ stoichiometric mixture |
| 9.3 | 4 | 50.2 | 96.8 | 7.51 | 6.3 |
| 13.3 | 8 | 41.5 | 100.4 | 2.67 | 6.6 |
| 17.3 | 12 | 58.8 | 105.3 | 1.38 | 13.1 |
| 21.3 | 16 | 82.1 | 109.0 | .88 | 91.8 |
| 25.3 | 20 | 105.0 | 117.6 | .34 | 196.8 |
| 29.3 | 24 | 25.5 | 26.9 | .01 | 131.2 |
| 33.3 | 28 | 0 | 0 | 0 | 0 |
| | REACTANTS: 9.1 psia of $H_2$ & $O_2$ stoichiometric mixture |
| 11.4 | 8 | 63.6 | 121.3 | 9.7 | 3.8 |
| 15.4 | 12 | 66.1 | 127.4 | 6.21 | 16.0 |
| 19.4 | 16 | 68.6 | 126.1 | 2.03 | 6.5 |
| 23.4 | 20 | 90.6 | 131.1 | 1.58 | 65.6 |
| 31.4 | 28 | 97.8 | 131.1 | .35 | 367.4 |
| 33.4 | 30 | 73.5 | 94.3 | .04 | 396.3 |
| 35.4 | 32 | 0 | 0 | 0 | 0 |
| | REACTANTS: 11.0 psia of $H_2$ * $O_2$ stoichiometric mixture |
| 13.6 | 12 | 73.5 | 138.4 | 11.5 | 3.5 |
| 17.6 | 16 | 68.6 | 133.5 | 5.15 | 7.3 |
| 21.6 | 20 | 73.4 | 154.3 | 3.56 | 7.5 |
| 25.6 | 24 | 97.9 | 154.3 | 2.12 | 19.7 |
| 29.6 | 28 | 96.8 | 154.3 | 2.10 | 98.4 |
| 33.6 | 32 | 107.6 | 158.0 | .85 | 250. |
| 37.6 | 36 | 107.8 | 178.8 | .41 | 407. |
| | REACTANTS: 12.7 psia of $H_2$ * $O_2$ stoichiometric mixture |
| 15.8 | 16 | 98.0 | 169.0 | 16.4 | 3.0 |
| 19.8 | 20 | 104.1 | 171.5 | 8.3 | 6.0 |
| 23.8 | 24 | 105.3 | 171.5 | 5.15 | 6.3 |
| 27.8 | 28 | 112.7 | 172.7 | 3.1 | 6.6 |
| 31.8 | 32 | 125.1 | 173.9 | 1.96 | 65.6 |
| 35.8 | 36 | 137.2 | 182.5 | .41 | 131.2 |

TABLE VII

INFLUENCE OF AIR DILUTION ON RATE AND AMOUNT OF FORCE GENERATED ALL EXPERIMENTS WITH TIRE NO. 4

| psia air | psig total | PSI FORCE inflection point $P_5$ | PSI FORCE maximum increase $P_6$ | REACTION RATE psi/millisecond | $t_2 - t_1$ milliseconds |
|---|---|---|---|---|---|
| | REACTANTS: 11.0 psia $O_2$ & $H_2$ plus 13.6 psia $N_2$ |
| 0 | 12 | 73.5 | 138.4 | 11.5 | 3.5 |
| 4 | 16 | 96.8 | 161.8 | 11.2 | 3.5 |
| 8 | 20 | 105.3 | 169.0 | 10.9 | 4.8 |
| 12 | 24 | 102.9 | 169.0 | 8.93 | 6.9 |
| 16 | 28 | 108.0 | 172.7 | 5.78 | 7.5 |
| 20 | 32 | 127.4 | 189.8 | 3.75 | 10.5 |
| 24 | 35 | 120.0 | 183.7 | 4.44 | Not defined |
| | REACTANTS: 12.7 psia $O_2$ & $H_2$ plus 15.8 psia $N_2$ |
| 0 | 16 | 98.0 | 169.0 | 16.4 | 3.5 |
| 4 | 20 | 112.7 | 187.4 | 13.2 | 5.0 |
| 8 | 24 | 123.7 | 186.2 | 13.9 | 3.8 |
| 12 | 28 | 129.8 | 199.6 | 13.0 | 5.0 |
| 16 | 32 | 124.9 | 193.5 | 12.2 | 8.8 |

TABLE VIII

INFLUENCE OF HYDROGEN DILUTION ON RATE AND AMOUNT OF FORCE GENERATED ALL EXPERIMENTSS WITH TIRE No. 4

| psia $H_2$ | psig total | PSI FORCE inflection point $P_5$ | PSI FORCE maximum increase $P_6$ | REACTION RATE psi/millisecond | $t_2 - t_1$ milliseconds |
|---|---|---|---|---|---|
| | REACTANTS: 11.0 psia $O_2$ * $H_2$ plus 13.6 psia $N_2$ |
| 0 | 12 | 73.5 | 138.4 | 11.5 | 3.5 |
| 4 | 16 | 88.2 | 148.2 | 11.9 | 1.5 |
| 8 | 20 | 83.2 | 151.4 | 8.06 | 1.3 |
| 12 | 24 | 77.2 | 149.9 | 4.46 | 11.8 |
| 16 | 28 | 115.8 | 153.1 | 2.33 | 11.8 |
| 20 | 32 | No Reaction | | | |
| | REACTANTS: 12.7 psia $O_2$ * $H_2$ plus 15.8 psia $N_2$ |
| 0 | 16 | 98.0 | 169.0 | 16.4 | 3.0 |
| 4 | 20 | 120.0 | 176.4 | 14.5 | 3.5 |
| 8 | 24 | 120.2 | 176.4 | 9.7 | 4.0 |
| 12 | 28 | 107.7 | 173.9 | 5.8 | 6.6 |
| 16 | 32 | 112.7 | 172.7 | 3.4 | 6.6 |
| 20 | 36 | 134.7 | 173.9 | 2.12 | 13.1 |

TABLE IX

INFLUENCE OF WATER DISPLACEMENT OF TIRE INTERIOR VOLUME UPON MAGNITUDE OF REACTANT CHARGE TO EFFECT AN OVERPRESSURE

| AIR psia | H$_2$ psia | MIXTURE psig | CALC. HEAT OF COMB. CALORIES | psi BUILD-UP OF WATER | psi BUILD-UP OF GAS | psi INCREASE/m sec. WATER | psi INCREASE/m sec. GAS* |
|---|---|---|---|---|---|---|---|
| \multicolumn{8}{l}{620 ml gas; 72125 ml water} |
| 17.4 | 7.3 | 12 | 760 | 63.9 | — | 7.8 | — |
| 22.9 | 9.8 | 20 | 1000 | 63.0 | — | 12.7 | — |
| 28.6 | 12.0 | 27.9 | 1250 | 102.5 | — | 14.1 | — |
| \multicolumn{8}{l}{20000 ml gas; 52745 ml water} |
| 8.9 | 3.8 | 0 | 12600 | 114.0 | 68.0 | 6.4 | 8.3 |
| 11.7 | 5.0 | 4 | 16500 | 112.7 | 80.8 | 8.7 | 9.6 |
| 14.6 | 6.1 | 8 | 20450 | 119.8 | 93.4 | 10.3 | 10.1 |
| 17.4 | 7.3 | 12 | 24400 | 139.3 | 107.2 | 12.6 | 12.1 |
| 20.2 | 8.9 | 16.4 | 28500 | 142.8 | 121.1 | 17.6 | 15.8 |
| 24.0 | 9.7 | 21.0 | 33400 | 161.2 | 133.9 | 22.4 | 23.0 |
| 25.8 | 10.9 | 24.0 | 36400 | 167.9 | 140.0 | 24.6 | 24.1 |
| 28.6 | 12.2 | 28.1 | 40400 | 186.1 | 157.1 | 28.6 | 16.9 |
| 31.4 | 13.6 | 32.5 | 44500 | 186.5 | 161.7 | 49.2 | 25.3 |
| 51.7 | 19.0 | 56.0 | 67900 | 262.0 | 234.0 | 45.0 | 28.0 |

*Pressure build-up traces have not been expanded. Due to equipment limitations, calculated values in excess of 20 psi/m. sec. are subject to considerable error.

I claim:

1. Method of determining an adequate dynamic strength level of the elements of a pneumatic tire comprising the steps of:
    suddenly increasing the pressure within the inflation chamber of the tire to a magnitude which will simultaneously subject the elements of the tire to a force of a duration and magnitude greater than one psi applied to the tire chamber at a rate greater than 0.5 psi per millisecond.

2. Carrying out the method of claim 1 by causing a pressure to be exerted within the pneumatic tire chamber at a rate of change of pressure and maximum pressure build-up which is equal to the rate of change and magnitude of force acting upon said elements of the tire during one revolution of rotation.

3. Carrying out the method of claim 1 by filling the tire with a combustible mixture of gases and igniting the mixture.

4. Carrying out claim 3 by using a hydrocarbon admixed with oxygen.

5. Carrying out claim 3 by using a hydrocarbon and air.

6. Carrying out the method of claim 3 by filling the tire chamber with an explosive mixture of an oxidant admixed with a gas selected from a group consisting of hydrogen, carbon monoxide, acetylene, and propane; the percentage composition of the mixture being selected to provide said magnitude of force and duration equal to the magnitude of the force to which the cords of the tire are subjected as the tire rolls through its footprint.

7. Carrying out the method of claim 3 by filling the tire chamber with a combustible mixture comprised of hydrogen, oxygen, and a diluent, wherein the percentage composition of hydrogen is in the range of 10-70 percent.

8. Carrying out the method of claim 1 by igniting a packaged solid energy source to provide a source of hot gases, and releasing the hot gases within the tire chamber.

9. The method of claim 8 and further including the step of partially filling the tire chamber with liquid to provide a liquid phase and a gaseous phase; and, releasing the hot gases within the liquid phase of the chamber.

10. The method of claim 1 and further including the step of filling the tire chamber with a combustible mixture of hydrogen and air; and, igniting the combustible mixture contained within the tire chamber.

11. The method of claim 1 and further including the steps of filling the tire chamber with a combustible mixture of hydrogen and oxygen; and, igniting the combustible mixture contained within the tire chamber.

12. Method of testing a plurality of pneumatic tires for determining the possible presence of hidden defects in the structural integrity thereof and the presence of sufficient dynamic strength comprising the steps of:
    placing a combustible mixture within the tire chamber of the tires which, when ignited, provides a controlled force within the tire chamber of a magnitude and duration to destroy the weakest tires including any tires having hidden structural defects of a magnitude to render the tires unsafe for their intended use;
    detonating said explosive mixture within said tire chamber, to thereby determine the presence or absence of any hidden defect therein which would cause the tire to have an insufficient dynamic strength.

13. The method of claim 12 wherein said explosive mixture comprises a gaseous mixture of an oxidant and a reducing agent.

14. The method of claim 12 wherein said explosive agent is a gaseous mixture of a hydrocarbon and an oxygen containing gas.

15. The method of claim 14 wherein said hydrocarbon is selected from the group consisting of carbon monoxide, acetylene, and hydrogen.

16. The method of claim 12 wherein said combustible mixture is a packaged solid energy source consisting of an oxidant and a reducing agent which is arranged so that when ignited, hot gases flow therefrom and into the tire chamber.

17. The method of claim 16 wherein the tire chamber is filled with liquid prior to igniting the combustible mixture.

18. The method of claim 12 wherein the combustible mixture is comprised of an oxidant and a reducing agent mixed together in a proportion to provide a force which has a magnitude greater than one psi applied within 10 milliseconds of time.

19. Method of determining the presence of flaws in a pneumatic tire comprising the steps of:

determining the duration and magnitude of a pressure force which must be applied to the internal peripheral wall surface of the tire chamber of the tire in order to subject the tire structure to a force and force application rate theoretically encountered at a designated condition of service during one revolution of rotation of the tire;

mounting the tire on a wheel means; and, suddenly increasing the internal pressure of the inflation agent contained within the tire chamber to thereby simulate said pressure force.

20. Method of testing tires for determination of an adequate dynamic strength level in the structure thereof comprising:

1. mounting the tire upon a support means so that the tire chamber thereof can contain an inflation agent therein;
2. exerting a force within the tire chamber by suddenly increasing the pressure of the inflation agent contained within the tire chamber;
3. controlling the magnitude and the rate of increase of the force of step (2) so that it is greater than one psi applied to the tire chamber at a rate greater than 0.5 psi per millisecond.

21. Method of determining the structural integrity of a pneumatic tire comprising the steps of:

mounting the tire upon a support means so that the chamber thereof can contain an inflation agent therein;

placing an explosive agent relative to the tire chamber of the tire so that said explosive agent, when ignited, provides a force within the tire chamber of the tire of a magnitude greater than one psi applied at a rate greater than 0.5 psi per millisecond;

detonating said explosive agent to thereby determine the presence or absence of sufficient structural integrity of the elements of the tire.

22. The method of claim 21 wherein said explosive agent comprises a gaseous mixture of an oxidant and a reducing agent.

23. The method of claim 21 wherein said explosive agent is a gaseous mixture of a hydrocarbon an an oxygen containing gas.

24. The method of claim 23 wherein said hydrocarbon is selected from the group consisting of carbon monoxide, acetylene, and hydrogen.

25. The method of claim 21 wherein the pneumatic tire has been subjected to usage to cause at least half of its tread surface to be worn away, and said test is utilized to determine the structural integrity of the tire for recapping purposes.

26. The method of claim 21 wherein said pneumatic tire is tested immediately after vulcanization while above 200° F.

27. The method of claim 26 and further including the steps of effecting a change in the structure of a second tire, detonating said explosive mixture within said second tire, comparing said first and second tires to determine the effect of said change in structure upon the tire.

28. Method of evaluating a structural change made in a tire comprising:

1. mounting a first tire upon a support means so that the pneumatic chamber thereof can contain an inflation agent therein;
2. exerting a force within the pneumatic chamber;
3. controlling the magnitude and the rate of increase of the force of step (2) to a value greater than one psi applied at 0.5 psi per millisecond;
4. progressively increasing the force of steps (2) and (3) until the tire structure fails;
5. mounting a second tire upon a support means so that the pneumatic chamber thereof can contain an inflation agent therein, said second tire having a tire structure which is different from said first tire;
6. exerting a force within the pneumatic chamber;
7. controlling the magnitude and the rate of increase of the force of step (6) so that the force exceeds one psi applied at a rate greater than 0.5 psi per millisecond;
8. progressively increasing the force of steps (6) and (7) until the tire structure fails;
9. comparing the force of steps (4) and (8) and selecting the greatest force as being representative of the most structurally sound tire to complete the evaluation.

29. The method of claim 28 wherein said explosive agent is a gaseous combustible mixture of hydrogen and oxygen.

30. The method of claim 28 wherein said explosive agent includes a gaseous mixture of a hydrocarbon and oxygen.

31. The method of claim 28 wherein said explosive agent is a gaseous hydrocarbon and air.

32. The method of claim 28 wherein said explosive agent is obtained by detonating a combustible mixture of an oxidant and a reducing agent.

33. The method of claim 32 wherein said explosive agent is a solid packaged type.

34. The method of claim 33 and further including the step of reducing the gaseous phase of the tire chamber by flowing a liquid thereinto.

35. The method of claim 28 wherein said force is provided by an explosive agent consisting of a reducing agent admixed with an oxidant;

said oxidant being selected from the group consisting of air, oxygen, and oxygen admixed with a diluent;

said reducing agent being selected from the group consisting of hydrogen, carbon monoxide, acetylene, and a saturated hydrocarbon of less than five carbon atoms having a chemical formula of $C_N H_{2N+2}$.

36. Method of determining the deterioration experienced by the elements of a tire under a condition of usage comprising the steps of:

1. providing a plurality of like tires and subjecting each tire to a different amount of usage;
2. mounting a first tire of said like tires upon a support means so that the tire chamber thereof can contain an inflation agent therein;
3. exerting a force within the tire chamber; and
4. controlling the magnitude and rate of increase of the force of step (3) so that the force is greater than one psi applied at a rate greater than 0.5 psi per millisecond of time;
5. progressively increasing the force of steps (3) and (4) until the first tire fails;
6. mounting the remaining tires of the like tires upon the support means so that the tire chambers thereof can contain an inflation agent therein and repeating steps (3), (4), and (5) for each of the remaining tires of said like tires;

7. comparing the forces required to fail each tire to obtain a profile of the effect of the usage of the tires upon the deterioration of the structural integrity of the tires.

37. Method for determining the adequacy of dynamic strength level in the elements of a pneumatic tire comprising the steps of:
1. determining the theoretical maximum pulse force and application rate thereof which a cord of a tire must withstand during one revolution of rotation while the tire is traveling at some condition of applied weight load, velocity, inflation pressure, and acceleration;
2. designating a safety factor multiplier to be applied to the maximum force and the force application rate determined in step (1); and, performing the required calculations in order to establish the minimum force and maximum force application rate for acceptability;
3. mounting the tire upon a support means so that the chamber thereof can contain an inflation agent therein;
4. inflating said tire;
5. exerting a force within the tire chamber;
6. controlling the magnitude and the rate of increase of the force of step (5) so that the minimum force and maximum force application rate of step (2) are realized;
7. determining the adequacy of dynamic strength level by examining the tire.

38. Carrying out the method of claim 37 by filling the tire with a combustible mixture of gases and igniting the mixture.

39. Carrying out claim 38 by using a hydrocarbon admixed with oxygen.

40. Carrying out the method of claim 37 by filling the tire chamber with an explosive mixture of hydrogen and oxygen, said ratio of hydrogen to oxygen being selected to provide said force of step (6).

41. Carrying out the method of claim 37 by filling the tire with a combustible mixture of hydrogen and air.

42. Carrying out the method of claim 37 by filling the tire chamber with a combustible mixture comprised of hydrogen, oxygen, and a diluent.

43. The method of claim 37 wherein said force is provided by an explosive agent consisting of a reducing agent admixed with an oxidant;
said oxidant being selected from the group consisting of air, oxygen, and oxygen admixed with a diluent;
said reducing agent being selected from the group consisting of hydrogen, carbon monoxide, acetylene, and a saturated hydrocarbon of less than five carbon atoms having a chemical formula of $C_N H_{2N+2}$.

44. The method of claim 37 wherein the force is provided by a solid type reactant which is connected to the tire chamber so that hot gases therefrom flow thereinto.

45. The method of claim 44 wherein the tire chamber is reduced in effective volume by placing an incompressible material therein.

46. Method of testing pneumatic tires for determining the presence of hidden defects in the structural integrity thereof or the presence of sufficient dynamic strength of the tire elements comprising the steps of:
1. mounting the tire upon a support means so that the tire chamber thereof can contain an inflation agent therein;
2. inflating the tire to a pressure above ambient;
3. exerting a force within the tire chamber by suddenly increasing the pressure of the inflation agent;
4. controlling the magnitude and the rate of increase of the force of step (3) so that it is greater than one psi applied at a rate of increase of 0.5 psi per millisecond of time.

47. Carrying out the method of claim 46 by igniting a packaged solid energy source and releasing said energy in the form of hot gases into the gaseous phase of the tire chamber.

48. The method of claim 46 and further including the step of adding liquid to the tire chamber.

49. Carrying out the method of claim 48 by igniting a packaged solid energy source and releasing said energy in the form of hot gases into the liquid phase of the tire chamber.

50. Method of testing tires for determination of an adequate dynamic strength level in the structure thereof comprising:
1. mounting the tire upon a support means so that the tire chamber thereof can contain an inflation agent therein;
2. placing an agent within the tire chamber which can be activated to suddenly increase the internal pressure thereof;
3. exerting a force within the tire chamber by activating the last said agent;
4. controlling the magnitude of the force exerted in step (3) to a value greater than the inflation pressure of the tire as employed in normal usage while simultaneously controlling the rate of increase of the force of step (3) so that said force is applied at the minimum rate of 0.5 psi per millisecond of time.

51. The method of claim 50 wherein the magnitude of the force of step (4) is four times as great as the inflation pressure of step (2).

52. Carrying out step (2) of claim 50 by employing an agent consisting essentially of a combustible mixture of hydrogen and oxygen.

53. Carrying out the method of claim 50 by filling the tire chamber with an explosive mixture of hydrogen and air, said ratio of hydrogen to air being selected to provide said force and duration set forth in step (4).

54. Carrying out the method of claim 50 by igniting a solid energy source which reacts at a rate to provide for the force set forth in step (4), and causing the gaseous effluent from the solid energy source to be contained within the tire chamber.

55. Apparatus for testing pneumatic tires in order to determine the presence of an adequate strength level in the structure thereof, comprising:
wheel means by which a tire can be supported with the tire chamber thereof being disposed so that it can contain an inflation agent therein;
inlet conduit means affixed to said wheel means by which an explosive agent can be transferred into the tire chamber;
means for detonating an explosive agent located within the tire chamber to provide a force within the tire chamber, said force being greater than one psi applied at a rate of increase of 0.5 psi per millisecond of time; and a sensing means for determining the profile of a pressure curve caused by said force as the force is effected within the tire chamber; so that, an explosive agent can be placed into the tire chamber to provide an explosive inflation medium, and the agent detonated to provide a force exerted within the tire chamber, after which the tire can be removed from the wheel means and inspected to determine the presence of any defect brought about as a consequence of said force.

56. The apparatus of claim 55, wherein said explosive agent for providing said force consists essentially of a reducing agent admixed with an oxidant;

said oxidant being selected from the group consisting of air, oxygen, and oxygen admixed with a diluent;

said reducing agent being selected from the group consisting of hydrogen, carbon monoxide, acetylene, and a saturated hydrocarbon of less than five carbon atoms having a chemical formula of $C_N H_{2N+2}$.

* * * * *